Oct. 18, 1966  T. J. BUDZYNSKI  3,279,834
BALL JOINT SEAL CONSTRUCTION
Filed April 15, 1964
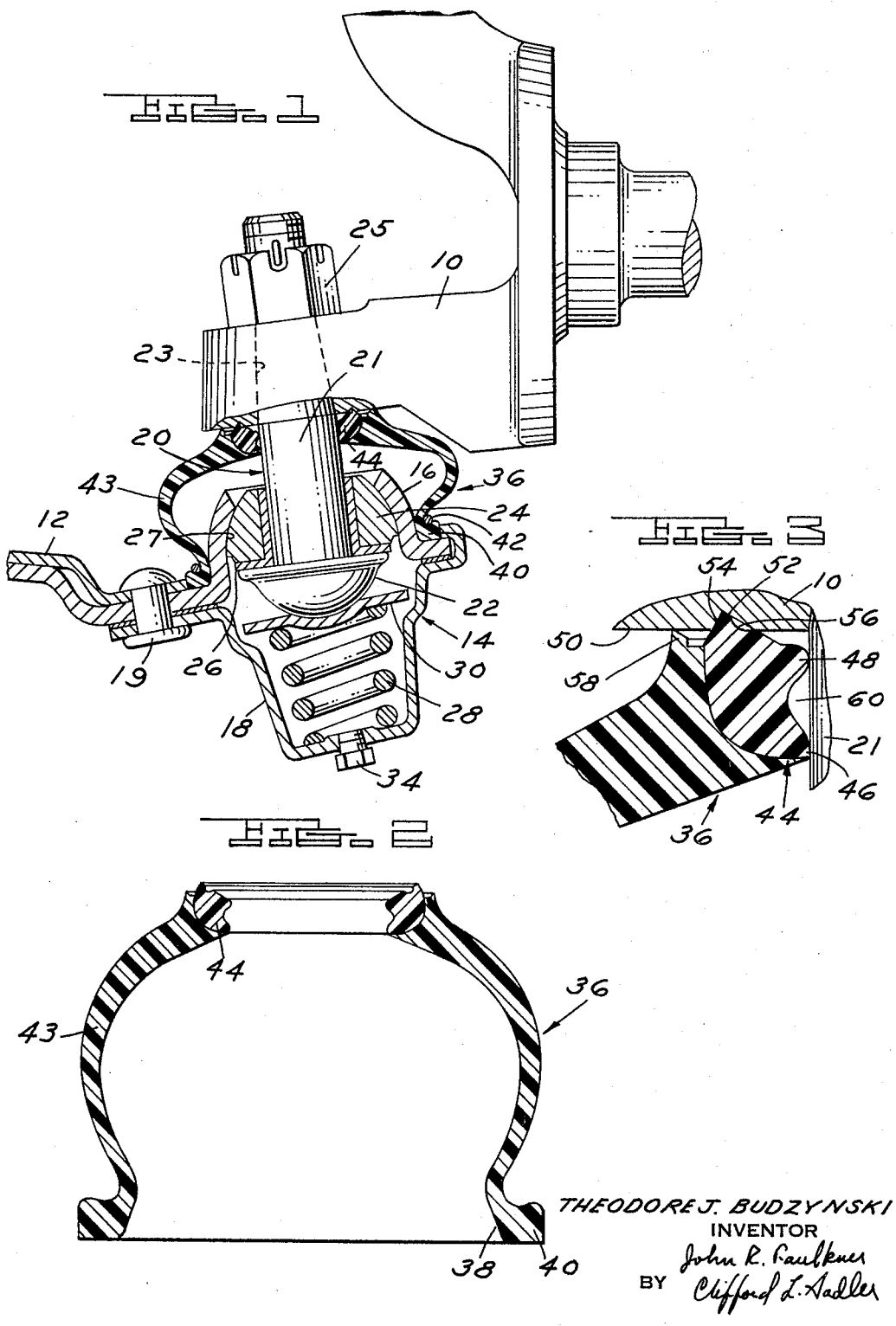
THEODORE J. BUDZYNSKI
INVENTOR
John R. Faulkner
BY Clifford L. Sadler
ATTORNEY

United States Patent Office 3,279,834
Patented Oct. 18, 1966

3,279,834
BALL JOINT SEAL CONSTRUCTION
Theodore J. Budzynski, Dearborn, Mich., assignor to Ford Motor Company, Dearborn, Mich., a corporation of Delaware
Filed Apr. 15, 1964, Ser. No. 359,987
6 Claims. (Cl. 287—90)

The present invention relates generally to ball and socket type joints, and more particularly to seal constructions for such joints.

Ball and socket joints provide an articulated connection between two relatively movable members. It is common practice to provide joints of this type in vehicle suspension systems to connect the suspension arms and the wheel spindle. Ball joints are also used in steering linkages.

A ball joint usually comprises a spherical or semi-spherical socket and a stud with a one- or two-piece spherical head that is seated in the socket. The joints are lubricated with grease to permit low friction movement. In order to retain the lubricant within the socket and prevent the entry of dirt that might damage the bearing surfaces, a boot type seal is usually provided. A boot seal is formed of a flexible material such as rubber in an annular shape with a small opening at one end surrounding the stud and a large opening surrounding the socket.

In automotive suspension systems, it has become a practice to provide prelubricated ball and socket joints containing a grease of improved quality that will retain good lubricating characteristics for extended usage beyond the heretofore 1000-mile servicing. In order to accommodate a ball joint construction having such lubrication, superior means must be provided to retain the grease and to prevent its contamination.

In accordance with this need, it is an object of the present invention to provide a boot type seal for a ball joint having superior sealing characteristics.

Further objects and advantages of the present invention will be more fully comprehended from the following discussion and the accompanying drawings, in which:

FIGURE 1 is an elevational view, partly in section, of a portion of a vehicle suspension system having a ball joint seal constructed in accordance with this invention;

FIGURE 2 is an elevational view, in section, of the seal portion of the suspension assembly of FIGURE 1; and FIGURE 3 is an enlarged elevational view showing a portion of the seal and related suspension structure of FIGURE 1.

Referring now to the drawings for a more complete understanding of the invention, FIGURE 1 discloses a portion of a vehicle suspension that includes a wheel spindle 10 and a suspension arm 12. A ball joint assembly 14 rotatably and tiltably connects the spindle 10 with the arm 12. The ball joint assembly 14 includes upper and lower socket portions 16 and 18 that are secured to the end of the arm 12 by rivets 19.

A stud member 20 has a shank portion 21 with a hemispherical head 22 at one end that is positioned within the socket portions 16, 18. An annular bearing member 24 cooperates with the head 22 to form the ball portion of the joint. The shank of the stud 20 is fitted in a tapered hole 23 in the wheel spindle 10 and secured by a nut 25.

A hat-shaped washer 26 is interposed between the annular bearing member 24 and the head portion 22. The washer 26 forms a bearing to accommodate steering movement of the spindle 10 and the stud 20.

A hemispherical internal bearing surface 27 is provided by the socket portion 16 that is slidably engaged by the annular bearing member 24 to accommodate tilting motion of the joint 14 during jounce and rebound suspension movement.

A coil spring 28 and a washer 30 preload the joint 14 and keep the bearing surfaces in their proper position. A threaded plug 34 is provided in the end of the socket portion 18 to permit the ball joint assembly 14 to be charged with a lubricant.

A flexible boot seal 36 surrounds the socket portion 16 and stud 20. It is the purpose of this seal to retain lubricant within the ball joint assembly 14 and to prevent the entry of water, dirt and other contaminants.

The seal 36 is an annular member having a large opening 38 at one end that is surrounded by an enlarged lip 40. This lip 40 is adapted to be secured to the socket portion 16 by a metal retaining ring 42. The body portion of the seal 36 bulges outwardly at 43 so that material is available for flexing during tilting movement.

An annular insert member 44 is provided at the upper small opening of the seal 36. Member 44 is molded from a high durometer rubber or plastic material and is cemented or otherwise secured to the body or remaining portion of the seal 36. The insert 44 has a pair of axially spaced apart annular ridges 46 and 48 on its inner surface that engage the shank 21 of the stud 20. The inside diameter of the ridges 46 and 48 is such that they are installed with a press fit.

Referring now to FIGURE 3, the spindle 10 has a flat downwardly facing surface 50 with a V-shaped groove 52 machined therein. The groove 52 is concentric about the hole 23. The upper end of the insert 44 is provided with a V-shaped ridge 54 that is fitted within the groove 52. The inner face of the V-shaped ridge 54 is molded to have a groove 56 that is sealed by the adjacent surface of the groove 52.

An upstanding lip 58 is molded in the body of the rubber boot 36. Lip 58 is spaced outwardly from the ridge 54 of the insert 44 and contacts the surface 50 of the spindle 10.

Another feature of this invention is the design of the thickness of the wall of the body of the seal 36. As indicated in FIGURE 2, the seal 36 is continuously tapered in thickness from an enlarged upper end where insert 44 is seated to its lower end where it merges with the lip 40. The continuously tapered thickness assures that the bulge 43 will have a comparatively gentle curve without a sharp bend that would lead to early deterioration of the seal when installed in an automobile. Heretofore, rubber seals have had a tendency to crack and otherwise fail where they are creased.

This seal construction is effective in preventing the entry of contaminants to the area confined by the body of the seal 36 and in preventing the loss of lubricant. When the ball joint assembly 14 is installed in the vehicle between the suspension arm and spindle, grease is trapped in the groove 56 and in the groove 60 between the ridges 46 and 48. The grease trapped in the grooves 56 and 60, in addition to enhancing the sealing properties, also lubricate the mating surfaces to permit steering motion of the stud 20 and spindle 10. The peripheral lip 58 functions as additional sealing means to prevent the entry of contaminants.

Modifications and alterations of this invention may occur to those skilled in the art that will come within the scope and spirit of the following claims.

I claim:

1. A suspension arm, a wheel spindle, a ball joint assembly having a socket part secured to said arm and a stud part secured to said spindle, said spindle having a flat surface generally perpendicular to the axis of said stud and facing said assembly, a flexible boot seal having a large open end secured about said socket part, said seal having a small end, a relatively hard circular member joined to said small end, said member being concentric about said stud and engaging said flat surface, said member having a pair of axially spaced apart inwardly directed annular ridges slidably engaging the surface of said stud, said flat surface having a V-shaped annular groove, said member having a generally V-shaped annular ridge portion seated within said V-shaped groove, one face of said ridge portion being provided with an annular grease groove, said grease groove being situated within the V-shaped groove of said surface, said small end having an upstanding lip seal spaced radially outwardly of said ridge portion and engaging said surface.

2. A suspension arm, a wheel spindle, a ball joint assembly having a socket part secured to said arm and a stud part secured to said spindle, said spindle having a flat surface generally perpendicular to the axis of said stud and facing said assembly, a seal having a large open end secured about said socket part, said seal having a small end concentric about said stud and engaging said flat surface, said small end having a pair of axially spaced apart inwardly directed annular ridges slidably engaging the surface of said stud, said flat surface having a V-shaped annular groove, said small end having a generally V-shaped annular ridge portion seated within said V-shaped groove, one face of said ridge portion being provided with an annular grease groove, said grease groove being situated within the V-shaped groove of said surface, an upstanding lip seal spaced radially outwardly of said ridge portion and engaging said surface.

3. A first element, a second element, a ball joint assembly having a socket part secured to said first element and a stud part secured to said second element, said second element having a flat surface generally perpendicular to the axis of said stud and facing said assembly, a seal having a large open end secured about said socket part, said seal having a small open end concentric about said stud and engaging said flat surface, said small end having a pair of axially spaced apart inwardly directed annular ridges slidably engaging the surface of said stud, said flat surface having a V-shaped annular groove, said small end having a generally V-shaped annular ridge portion seated within said V-shaped groove, an upstanding lip seal spaced radially outwardly of said ridge portion and engaging said surface.

4. A first element, a second element, a ball joint assembly having a socket part secured to one of said elements and a stud part secured to the other of said elements, said assembly providing an articulated connection between said elements, said other element having a flat surface generally perpendicular to the axis of said stud and facing said assembly, a flexible boot seal having a large open end secured about said socket part, said seal having a small end, a relatively hard circular member joined to said small end, said member being concentric about said stud and engaging said flat surface, said member having a sealing surface slidably engaging said stud, said flat surface having a V-shaped annular groove, said member having a generally V-shaped annular ridge portion seated within said V-shaped groove, one face of said ridge portion being provided with an annular grease groove, said grease groove being situated within said V-shaped groove.

5. An annular boot seal for a ball joint assembly having a socket part and a stud part, said seal having a large open end adapted to be secured about said socket part, said seal having a small open end, said small end having a pair of axially spaced apart inwardly directed annular ridges adapted to slidably engage the surface of said stud, said small end also having a generally V-shaped upstanding ridge portion spaced radially outwardly of said annular ridges, the inner face of said ridge portion being provided with an annular grease groove, an upstanding lip seal spaced radially outwardlly of said ridge portion.

6. An annular boot seal for a ball joint assembly having a socket part and a stud part, said seal having a large open end adapted to be secured about said socket part, said seal having a small open end, said small end having a pair of axially spaced apart inwardly directed relatively rigid annular ridges adapted to slidably engage the surface of said stud, said small end also having a generally V-shaped upstanding rigid ridge portion spaced radially outwardly of said annular ridges, a flexible upstanding lip seal spaced radially outwardly of said ridge portion.

References Cited by the Examiner

UNITED STATES PATENTS

| | | |
|---|---|---|
| 2,921,809 | 1/1960 | Kogstrom. |
| 3,166,333 | 1/1965 | Henley. |
| 3,175,834 | 3/1965 | Wallace et al. |
| 3,208,290 | 9/1965 | Mathues et al. |

CARL W. TOMLIN, *Primary Examiner.*

A. V. KUNDRAT, *Assistant Examiner.*